US010334564B2

(12) United States Patent
Quan et al.

(10) Patent No.: US 10,334,564 B2
(45) Date of Patent: Jun. 25, 2019

(54) RRC MESSAGE PROCESSING METHOD, USER EQUIPMENT, AND BASE STATION

(71) Applicant: HUAWEI TECHNOLOGIES CO., LTD., Shenzhen (CN)

(72) Inventors: Wei Quan, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 15/192,039

(22) Filed: Jun. 24, 2016

(65) Prior Publication Data

US 2016/0309526 A1    Oct. 20, 2016

Related U.S. Application Data

(63) Continuation of application No. PCT/CN2013/090739, filed on Dec. 27, 2013.

(51) Int. Cl.
*H04W 72/04* (2009.01)
*H04W 48/08* (2009.01)
*H04W 76/10* (2018.01)

(52) U.S. Cl.
CPC .......... *H04W 72/04* (2013.01); *H04W 48/08* (2013.01); *H04W 76/10* (2018.02)

(58) Field of Classification Search
CPC .............................. H04W 76/02; H04W 72/04
See application file for complete search history.

(56) References Cited

U.S. PATENT DOCUMENTS

2005/0078653 A1    4/2005   Agashe et al.
2006/0209675 A1    9/2006   Jacobson
(Continued)

FOREIGN PATENT DOCUMENTS

CN    101170795 A    4/2008
CN    102057695 A    5/2011
(Continued)

OTHER PUBLICATIONS

Office Action, dated Sep. 28, 2018, in Chinese Application No. 201380028492.9 (7 pp.).
(Continued)

*Primary Examiner* — Zhiren Qin
(74) *Attorney, Agent, or Firm* — Staas & Halsey LLP

(57) ABSTRACT

Embodiments of the present invention provide an RRC message processing method, user equipment, and a base station. On a UE side, it is determined, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and no response is made to the first RRC message when it is determined that the first RRC message and the second RRC message are repeated RRC messages.

10 Claims, 11 Drawing Sheets

(56) References Cited

U.S. PATENT DOCUMENTS

| | | | |
|---|---|---|---|
| 2010/0034171 A1* | 2/2010 | Pelletier | H04W 36/0055 370/331 |
| 2011/0085488 A1 | 4/2011 | Widegren | |
| 2011/0092236 A1* | 4/2011 | Iwamura | H04L 63/123 455/507 |
| 2012/0003977 A1* | 1/2012 | Iwamura | H04W 36/0033 455/436 |
| 2013/0189990 A1* | 7/2013 | Kim | H04W 36/30 455/436 |
| 2014/0056243 A1* | 2/2014 | Pelletier | H04W 74/04 370/329 |

FOREIGN PATENT DOCUMENTS

| | | |
|---|---|---|
| CN | 102119554 A | 7/2011 |
| CN | 103260212 A | 8/2013 |
| WO | 2013/066258 A2 | 5/2013 |

OTHER PUBLICATIONS

International Search Report dated Sep. 2, 2014, in corresponding International Application No. PCT/CN2013/090739.
International Search Report dated Sep. 2, 2014 in corresponding International Patent Application No. PCT/CN2013/090739.
Partial Supplementary European Search Report dated Oct. 27, 2016 in corresponding European Patent Application No. 13900328.9.

\* cited by examiner

RRC MESSAGE PROCESSING METHOD, USER EQUIPMENT, AND BASE STATION

CROSS-REFERENCE TO RELATED APPLICATIONS

This application is a continuation of International Application No. PCT/CN2013/090739, filed on Dec. 27, 2013, which is hereby incorporated by reference in its entirety.

TECHNICAL FIELD

The present invention relates to the field of communications technologies, and in particular, to an RRC message processing method, user equipment, and a base station.

BACKGROUND

A small cell node (SCN, Small Cell Node) is a low-power wireless access node and works on a licensed or unlicensed spectrum. A macro base station may cover several kilometers, and the small cell node may cover an area from 10 meters to 200 meters. The SCN may be applied to indoor and outdoor environments to expand a coverage area and increase a network capacity in combination with the macro base station (eNB, E-UTRAN NodeB). In a network deployment scenario shown in FIG. 1, a coverage area of an eNB is a coverage area illustrated by a dashed line 101, and a coverage area of an SCN is a coverage area illustrated by a solid line 102. Each of the eNB and the SCN may control one or more cells, a cell controlled by the eNB may be referred to as a macro cell, and a cell controlled by the SCN may be referred to as a small cell. In a sparse deployment scenario, a quantity of small cells is relatively small, and one or a few SCNs may be deployed in a service hotspot area. In a dense deployment scenario, a quantity of small cells is relatively large, and a large quantity of SCNs may be deployed in a service hotspot area. The SCN may assist the eNB in offloading a service of a heavily loaded eNB.

A Radio Resource Control Protocol (RRC, Radio Resource Control) message is layer 3 information for processing a control plane between user equipment (UE, User Equipment) and a base station. The RRC message is mainly responsible for allocating a radio resource and carrying all parameters needed during establishment, modification, and releasing of a layer 2 protocol entity and a physical layer protocol entity. Therefore, when establishing a connection to the base station, reestablishing a connection to the base station, and releasing a connection to the base station, the UE needs to interact with the base station by using the RRC message.

Although an SCN and an eNB may be enabled to cooperate to perform network deployment, in the prior art, the following special case still exists: In a movement process of UE, cell handovers are frequently performed between multiple macro cells, or between small cells, or between a macro cell and a small cell. Consequently, when the UE is handed over to a new cell in the movement process, the UE cannot reliably receive an RRC message such as a handover command due to inter-cell interference. Therefore, the UE cannot access the new cell in time, and even a handover failure is caused, which affects handover performance.

SUMMARY

Embodiments of the present invention provide an RRC message processing method, user equipment, and a base station, so as to resolve a low reliability problem of an RRC message transmitted between UE and a base station in the prior art.

According to a first aspect, an RRC message processing method is provided, including:

determining, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and skipping responding to the first RRC message when it is determined that the first RRC message and the second RRC message are repeated RRC messages.

With reference to the first aspect, in a first possible implementation manner, the method further includes: responding to the first RRC message when it is determined that the first RRC message and the second RRC message are non-repeated RRC messages; and storing the first RRC message for a preset time length, or storing, for a preset time length, the designated information carried in the first RRC message.

With reference to the first possible implementation manner of the first aspect, in a second possible implementation manner, the second RRC message is an RRC message received and stored within the preset time length before the first RRC message is received; or the designated information carried in the second RRC message is designated information carried in an RRC message received and stored within the preset time length before the first RRC message is received.

With reference to the first aspect or the first possible implementation manner of the first aspect, or with reference to the second possible implementation manner of the first aspect, in a third possible implementation manner, before the determining whether the first RRC message and the second RRC message are repeated RRC messages, the method further includes: determining whether the designated information of the first RRC message includes a repetition identifier, where the repetition identifier is used to indicate that there is another RRC message already sent by a base station or to be sent by a base station, and the another RRC message is the same as the first RRC message including the repetition identifier; and the determining, according to designated information carried in a received first RRC message and designated information carried in a second RRC message received before the first RRC message is received, whether the first RRC message and the second RRC message are repeated RRC messages includes: when the designated information of the first RRC message includes the repetition identifier, determining, according to the designated information carried in the received first RRC message and the designated information carried in the second RRC message received before the first RRC message is received, whether the first RRC message and the second RRC message are repeated RRC messages.

With reference to the third possible implementation manner of the first aspect, in a fourth possible implementation manner, the determining, according to designated information carried in a received first RRC message and designated information carried in a second RRC message received before the first RRC message is received, whether the first RRC message and the second RRC message are repeated RRC messages includes: when the designated information of the first RRC message does not include the repetition identifier, determining that the first RRC message and the second RRC message are non-repeated RRC messages.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the designated information further includes: a node identifier of a node sending an RRC message carrying the designated information; and the determining, according to designated information carried in a received first RRC message and designated information carried in a second RRC message received before the first RRC message is received, whether the first RRC message and the second RRC message are repeated RRC messages specifically includes: determining, according to a first node identifier carried in the received first RRC message and a second node identifier carried in the second RRC message received and stored before the first RRC message is received, whether a first node sending the first RRC message and a second node sending the second RRC message are a same node; and when the first node sending the first RRC message and the second node sending the second RRC message are the same node, determining that the first RRC message and the second RRC message are non-repeated RRC messages.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, before the first RRC message is received, the method further includes: receiving a repeated-RRC message processing instruction sent by the base station, where the repeated-RRC message processing instruction is used to indicate to UE that there is an RRC message repeated with the first RRC message after the repeated-RRC message processing instruction is received; or the repeated-RRC message processing instruction is used to instruct UE to determine, after the repeated-RRC message processing instruction is received, whether the first RRC message and the second RRC message are repeated RRC messages.

According to a second aspect, an RRC message processing method is provided, including:

when a first base station generates at least two RRC messages whose message payloads are the same, sending one RRC message in the at least two RRC messages whose message payloads are the same to UE by using the first base station; and sending, to a designated second base station, a remaining RRC message except the RRC message sent by using the first base station, and sending the remaining RRC message to the UE by using the designated second base station.

With reference to the second aspect, in a first possible implementation manner, there is a communications interface between a Packet Data Convergence Protocol PDCP layer of a protocol stack of the first base station and a Radio Link Control RLC layer of a protocol stack of the designated second base station; that a first base station generates at least two RRC messages whose message payloads are the same specifically includes: generating, by an RRC layer of the protocol stack of the first base station, at least two RRC messages whose message payloads are the same, transmitting the at least two RRC messages whose message payloads are the same to the PDCP layer of the protocol stack of the first base station, and sending, to the PDCP layer, a first processing instruction used to instruct the PDCP layer to process the at least two RRC messages whose message payloads are the same; the sending one RRC message in the at least two RRC messages whose message payloads are the same to UE by using the first base station specifically includes: encapsulating, by the PDCP layer of the protocol stack of the first base station according to the received first processing instruction, the at least two RRC messages whose message payloads are the same, and sending one RRC message in at least two encapsulated RRC messages whose message payloads are the same to the UE by using protocol layers below the PDCP layer; and the sending a remaining RRC message to a designated second base station specifically includes: sending, by the PDCP layer of the protocol stack of the first base station according to the received first processing instruction, a remaining RRC message to the RLC layer of the protocol stack of the designated second base station by using the interface between the PDCP layer and the RLC layer of the protocol stack of the designated second base station, where the remaining RRC message is an RRC message that is except the RRC message sent by using the protocol stack of the first base station and that is in the at least two encapsulated RRC messages whose message payloads are the same.

With reference to the second aspect, in a second possible implementation manner, there is a communications interface between a PDCP layer of a protocol stack of the first base station and an RLC layer of a protocol stack of the designated second base station; that a first base station generates at least two RRC messages whose message payloads are the same specifically includes: generating, by an RRC layer of the protocol stack of the first base station, one RRC message; transmitting the RRC message to the PDCP layer of the protocol stack of the first base station, sending, to the PDCP layer, a second processing instruction used to instruct the PDCP layer to process the RRC message, and generating, by the PDCP layer of the protocol stack of the first base station according to the received second processing instruction, at least two RRC messages whose message payloads are the same and that are encapsulated by the PDCP layer; the sending one RRC message in the at least two RRC messages whose message payloads are the same to UE by using the first base station specifically includes: sending, by the PDCP layer of the protocol stack of the first base station, one RRC message in the generated at least two encapsulated RRC messages to the UE by using layers below the PDCP layer; and the sending a remaining RRC message to a designated second base station specifically includes: sending, by the PDCP layer of the protocol stack of the first base station according to the received second processing instruction, a remaining RRC message separately to the RLC layer of the protocol stack of the designated second base station by using the interface between the PDCP layer and the RLC layer of the protocol stack of the designated second base station, where the remaining RRC message is an RRC message that is except the RRC message sent by using the protocol stack of the first base station and that is in the at least two encapsulated RRC messages.

With reference to the second aspect, in a third possible implementation manner, there is a communications interface between an RRC layer of a protocol stack of the first base station and a PDCP layer of a protocol stack of the designated second base station; that a first base station generates at least two RRC messages whose message payloads are the same specifically includes: generating, by the RRC layer of the protocol stack of the first base station, at least two RRC messages whose message payloads are the same; the sending one RRC message in the at least two RRC messages whose message payloads are the same to UE by using the first base station specifically includes: sending, by the RRC layer of the protocol stack of the first base station to the UE by using the protocol stack of the first base station, one RRC message in the at least two RRC messages whose message payloads are the same; and the sending a remaining RRC message to a designated second base station specifically includes: sending, by the RRC layer of the protocol stack of the first base station, a remaining RRC message to the PDCP layer of the protocol stack of the designated second base station by using the interface between the RRC layer and the PDCP layer of the protocol stack of the designated second base station, where the remaining RRC message is an RRC message that is except the RRC message sent by using the protocol stack of the first base station and that is in the at least two RRC messages whose message payloads are the same.

With reference to the second aspect, in a fourth possible implementation manner, before the first base station sends an RRC message to the UE and the designated second base station, the method further includes: sending, by the first base station, a repeated-RRC message processing instruction to the UE, where the repeated-RRC message processing instruction is used to indicate to the UE that there is an RRC message repeated with the RRC message after the repeated-RRC message processing instruction is received; or the repeated-RRC message processing instruction is used to instruct the UE to determine, after the repeated-RRC message processing instruction is received, whether the RRC message and a received RRC message are repeated RRC messages, where the received RRC message is an RRC message received and stored within a preset time length before the RRC message is received; or the received RRC message is an RRC message that stores designated information carried in the received RRC message and that is received within a preset time length before the RRC message is received.

According to a third aspect, user equipment UE is provided, including:

a determining module, configured to determine, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and a responding module, configured to skip responding to the first RRC message when the determining module determines that the first RRC message and the second RRC message are repeated RRC messages.

With reference to the third aspect, in a first possible implementation manner, the UE further includes a storage module, where the responding module is further configured to respond to the first RRC message when the determining module determines that the first RRC message and the second RRC message are non-repeated RRC messages; and the storage module is configured to: when the determining module determines that the first RRC message and the second RRC message are non-repeated RRC messages, store the first RRC message for a preset time length, or store, for a preset time length, the designated information carried in the first RRC message.

With reference to the first possible implementation manner of the third aspect, in a second possible implementation manner, the second RRC message is an RRC message received and stored within the preset time length before the first RRC message is received; or the designated information carried in the second RRC message is designated information carried in an RRC message received and stored within the preset time length before the first RRC message is received.

With reference to the third aspect, or the first possible implementation manner of the third aspect, or the second possible implementation manner of the third aspect, in a third possible implementation manner, the determining module is further configured to: before it is determined whether the first RRC message and the second RRC message are repeated RRC messages, determine whether the designated information of the first RRC message includes a repetition identifier, where the repetition identifier is used to indicate that there is another RRC message already sent by a base station or to be sent by a base station, and the another RRC message is the same as the first RRC message including the repetition identifier; and the determining module is specifically configured to: when the designated information of the first RRC message includes the repetition identifier, determine, according to the designated information carried in the received first RRC message and the designated information carried in the second RRC message received before the first RRC message is received, whether the first RRC message and the second RRC message are repeated RRC messages.

With reference to the third possible implementation manner of the third aspect, in a fourth possible implementation manner, the determining module is specifically configured to: when the designated information of the first RRC message does not include the repetition identifier, determine that the first RRC message and the second RRC message are non-repeated RRC messages.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner, the designated information further includes: a node identifier of a node sending an RRC message carrying the designated information; and the determining module is specifically configured to: determine, according to a first node identifier carried in the received first RRC message and a second node identifier carried in the second RRC message received and stored before the first RRC message is received, whether a first node sending the first RRC message and a second node sending the second RRC message are a same node; and when the first node sending the first RRC message and the second node sending the second RRC message are the same node, determine that the first RRC message and the second RRC message are non-repeated RRC messages.

With reference to the third aspect, or the first possible implementation manner of the third aspect, or the second possible implementation manner of the third aspect, or the third possible implementation manner of the third aspect, or the fourth possible implementation manner of the third aspect, or the fifth possible implementation manner of the third aspect, in a sixth possible implementation manner, the UE further includes a receiving module, where the receiving module is configured to: before the first RRC message is received, receive a repeated-RRC message processing instruction sent by the base station, where the repeated-RRC message processing instruction is used to indicate to the UE that there is an RRC message repeated with the first RRC message after the repeated-RRC message processing instruction is received; or the repeated-RRC message processing instruction is used to instruct the UE to determine, after the repeated-RRC message processing instruction is received, whether the first RRC message and the second RRC message are repeated RRC messages.

According to a fourth aspect, a base station is provided, including:

a generation module, configured to generate an RRC message;

a first sending module, configured to: when the generation module generates at least two RRC messages whose message payloads are the same, send one RRC message in the at least two RRC messages whose message payloads are the same to UE by using the base station; and a second sending module, configured to: send, to designated another base station, a remaining RRC message except the RRC message sent by using the base station, and send the remaining RRC message to the UE by using the designated another base station.

With reference to the fourth aspect, in a first possible implementation manner, there is a communications interface between a Packet Data Convergence Protocol PDCP layer of a protocol stack of the base station and a Radio Link Control RLC layer of a protocol stack of the designated another base station; the generation module is specifically configured to be used by an RRC layer of the protocol stack of the base station to generate at least two RRC messages whose message payloads are the same, transmit the at least two RRC messages whose message payloads are the same to the PDCP layer of the protocol stack of the base station, and send, to the PDCP layer, a first processing instruction used to instruct the PDCP layer to process the at least two RRC messages whose message payloads are the same; the first sending module is specifically configured to be used by the PDCP layer of the protocol stack of the base station to encapsulate, according to the received first processing instruction sent by the generation module, the at least two RRC messages whose message payloads are the same, and send one RRC message in at least two encapsulated RRC messages whose message payloads are the same to the UE by using protocol layers below the PDCP layer; and the second sending module is specifically configured to be used by the PDCP layer of the protocol stack of the base station to send, according to the received first processing instruction sent by the generation module, a remaining RRC message to the RLC layer of the protocol stack of the designated another base station by using the interface between the PDCP layer and the RLC layer of the protocol stack of the designated another base station, where the remaining RRC message is an RRC message that is except the RRC message sent by using the protocol stack of the base station and that is in the at least two encapsulated RRC messages whose message payloads are the same.

With reference to the fourth aspect, in a second possible implementation manner, there is a communications interface between a PDCP layer of a protocol stack of the base station and an RLC layer of a protocol stack of the designated another base station; the generation module is specifically configured to be used by an RRC layer of the protocol stack of the base station to generate one RRC message, transmit the RRC message to the PDCP layer of the protocol stack of the base station, and send, to the PDCP layer, a second processing instruction used to instruct the PDCP layer to process the RRC message; and configured to be used by the PDCP layer of the first base station to generate, according to the received second processing instruction, at least two RRC messages whose message payloads are the same and that are encapsulated by the PDCP layer; the first sending module is specifically configured to be used by the PDCP layer of the protocol stack of the base station to send, to the UE by using layers below the PDCP layer, one RRC message in at least two encapsulated RRC messages generated by the generation module; and the second sending module is specifically configured to be used by the PDCP layer of the protocol stack of the base station to send, according to the received second processing instruction, a remaining RRC message to the RLC layer of the protocol stack of the designated another base station by using the interface between the PDCP layer and the RLC layer of the protocol stack of the designated another base station, where the remaining RRC message is an RRC message that is except the RRC message sent by using the protocol stack of the base station and that is in the at least two encapsulated RRC messages.

With reference to the fourth aspect, in a third possible implementation manner, there is a communications interface between an RRC layer of a protocol stack of the base station itself and a PDCP layer of a protocol stack of the designated another base station; the generation module is specifically configured to be used by the RRC layer of the protocol stack of the base station to generate at least two RRC messages whose message payloads are the same; the first sending module is specifically configured to be used by the RRC layer of the protocol stack of the base station to send, to the UE by using the protocol stack of the base station, one RRC message in the at least two RRC messages whose message payloads are the same and that are generated by the generation module; and the second sending module is specifically configured to be used by the RRC layer of the protocol stack of the base station to send a remaining RRC message to the PDCP layer of the protocol stack of the designated another base station by using the interface between the RRC layer and the PDCP layer of the protocol stack of the designated another base station, where the remaining RRC message is an RRC message that is except the RRC message sent by using the protocol stack of the base station and that is in the at least two RRC messages whose message payloads are the same.

With reference to the fourth aspect, in a fourth possible implementation manner, the base station further includes a third sending module, where the third sending module is configured to: before the first sending module sends an RRC message to the UE and the second sending module sends an RRC message to the designated another base station, send a repeated-RRC message processing instruction to the UE, where the repeated-RRC message processing instruction is used to indicate to the UE that there is an RRC message repeated with an RRC message received after the repeated-RRC message processing instruction is received; or the repeated-RRC message processing instruction is used to instruct the UE to determine, after the repeated-RRC message processing instruction is received, whether the RRC message and a received RRC message are repeated RRC messages, where the received RRC message is an RRC message received and stored within a preset time length before the RRC message is received; or the received RRC message is an RRC message that stores designated information carried in the received RRC message and that is received within a preset time length before the RRC message is received.

Beneficial effects of the embodiments of the present invention include:

The embodiments of the present invention provide the RRC message processing method, the user equipment, and the base station. On a base station side, when a first base station generates at least two RRC messages whose message payloads are the same, one RRC message in the at least two RRC messages whose message payloads are the same is sent to UE by using the first base station, a remaining RRC message except the RRC message sent by using the first base station is sent separately to a designated second base station, and the remaining RRC message is sent to the UE by using the designated second base station. The at least two RRC messages whose message payloads are the same are sent to the UE by means of cooperation between the first base station and the designated second base station, which improves RRC message transmission reliability.

On a UE side, it is determined, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and no response is made to the first RRC message when it is determined that the first RRC message and the second RRC message are repeated RRC messages. When multiple RRC messages are received on the UE side, not all the RRC messages are processed. Instead, it is first determined whether the multiple RRC messages are repeated RRC messages, and no response is made to a repeated RRC message. Therefore, processing complexity of the UE is reduced while RRC message transmission reliability is improved, thereby avoiding a waste of an air interface resource.

DESCRIPTION OF EMBODIMENTS

Embodiments of the present invention provide an RRC message processing method, user equipment, and a base station. The following describes embodiments of the present invention with reference to the accompanying drawings of the specification. It should be understood that the embodiments described herein are only used to illustrate and explain the present invention but not to limit the present invention. Moreover, the embodiments in this application and characteristics in the embodiments may be mutually combined in a case in which they do not conflict with each other.

Figure 1:
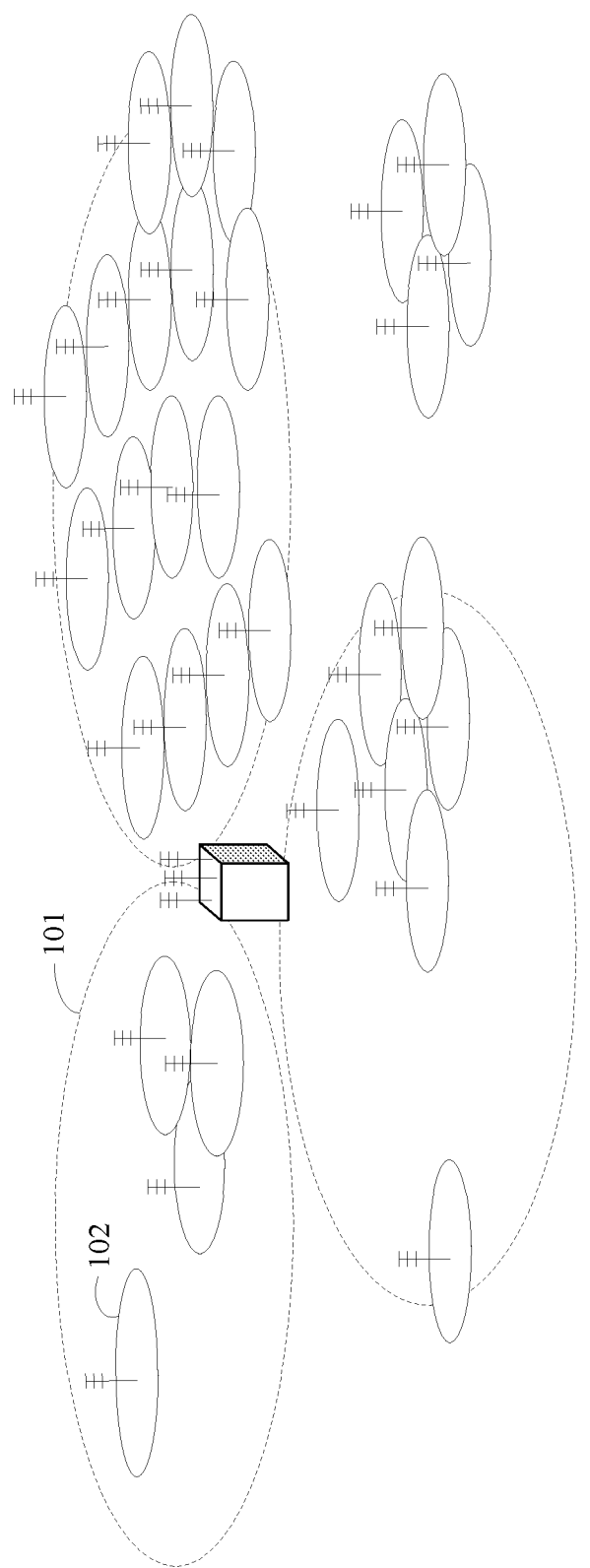
FIG. 1 is a network deployment scenario in which a macro base station and a small cell node are combined according to the background of the present invention.
Figure 2:
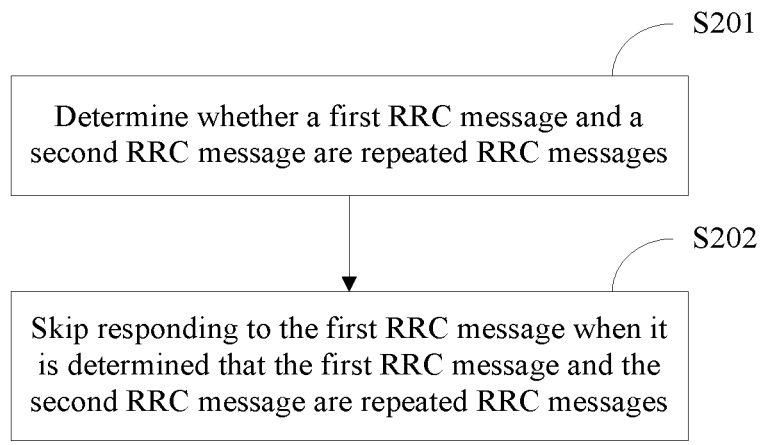
FIG. 2 is a flowchart of an RRC message processing method applied to a UE side according to an embodiment of the present invention.

An embodiment of the present invention provides an RRC message processing method, where the method is applied to a UE side, and as shown in FIG. 2, specifically includes the following steps:

S201. Determine, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information.

S202. Skip responding to the first RRC message when it is determined that the first RRC message and the second RRC message are repeated RRC messages.

Further, in the foregoing step S201, a base station sends an RRC information to UE, and the UE responds to the RRC information. This process may be referred to as an RRC process. An RRC transaction identifier in designated information is an identifier of an RRC process, and RRC transaction identifiers corresponding to RRC processes performed by the UE within a period of time are generally different. Therefore, when transaction identifiers of received RRC messages are different from each other, it can be determined that the RRC messages are non-repeated RRC messages.

An RRC message type in designated information may also be used to determine whether received RRC messages are repeated RRC messages. The RRC message type may include: an RRC reconfiguration message, an RRC connection establishment message, an RRC connection reestablishment message, and the like. When types of received RRC messages are different from each other, it can be determined that the RRC messages are non-repeated RRC messages.

An RRC message may consist of an RRC message header and an RRC message payload. When message payloads of received RRC messages are different from each other, it can be determined that the RRC messages are non-repeated RRC messages.

Further, when it is determined, according to the designated information carried in the first RRC message and the designated information carried in the second RRC message, whether the first RRC message and the second RRC message are repeated RRC messages, one or more of an RRC transaction identifier, an RRC message type, or a message payload of an RRC message that are in the first RRC message may be used to compare with one or more of an RRC transaction identifier, an RRC message type, or a message payload of an RRC message that are in the second RRC message. For example, when the message payload of the RRC message in the first RRC message is different from the message payload of the RRC message in the second RRC message, it can be determined that the first RRC message and the second RRC message are non-repeated RRC messages. When an RRC message payload in the first RRC message is the same as an RRC message payload in the second RRC message, it is necessary to further determine, by using other information in the designated information except the RRC message payload, whether the first RRC message and the second RRC message are repeated RRC messages.

When the RRC transaction identifier in the first RRC message is different from the RRC transaction identifier in the second RRC message, it can be determined that the first RRC message and the second RRC message are non-repeated RRC messages. When the RRC transaction identifier in the first RRC message is the same as the RRC transaction identifier in the second RRC message, it is necessary to further determine, by using other information in the designated information except the RRC transaction identifier, whether the first RRC message and the second RRC message are repeated RRC messages.

When the RRC message type in the first RRC message is different from the RRC message type in the second RRC message, it can be determined that the first RRC message and the second RRC message are non-repeated RRC messages. When the RRC message type in the first RRC message is the same as the RRC message type in the second RRC message, it is necessary to further determine, by using other information in the designated information except the RRC message type, whether the first RRC message and the second RRC message are repeated RRC messages.

Further, the second RRC message in the foregoing step S201 may be one or more second RRC messages. When there is one second RRC message, comparison is performed between the designated information carried in the first RRC message and the designated information carried in the second RRC message, so as to determine whether the first RRC message and the second RRC message are repeated RRC messages. When there are multiple second RRC messages, comparison is performed separately between the designated information carried in the first RRC message and designated information carried in each second RRC message, so as to determine whether the first RRC message and any second RRC message are repeated RRC messages. When the first RRC message and any second RRC message are repeated RRC messages, it is determined that the first RRC message and the second RRC message are repeated RRC messages.

Further, in the foregoing step S202, the skipping responding to the first RRC message may be skipping executing an operation indicated by the first RRC message. Further, the first RRC message may be discarded. A specific discard operation may be executed by a protocol layer identifying that the first RRC message is an RRC message repeated with the second RRC message. That is, a PDCP layer may be enabled to identify the received first RRC message, or an RRC layer may be enabled to identify the received first RRC message. Moreover, when the PDCP layer or the RRC layer identifies that the first RRC message is an RRC message repeated with the second RRC message, the protocol layer may discard the first RRC message.

Further, if the received first RRC message is the RRC message first received by the UE, that is, the UE does not receive the second RRC message before receiving the first RRC message, the UE can determine that the first RRC message is a non-repeated RRC message.

Figure 3:
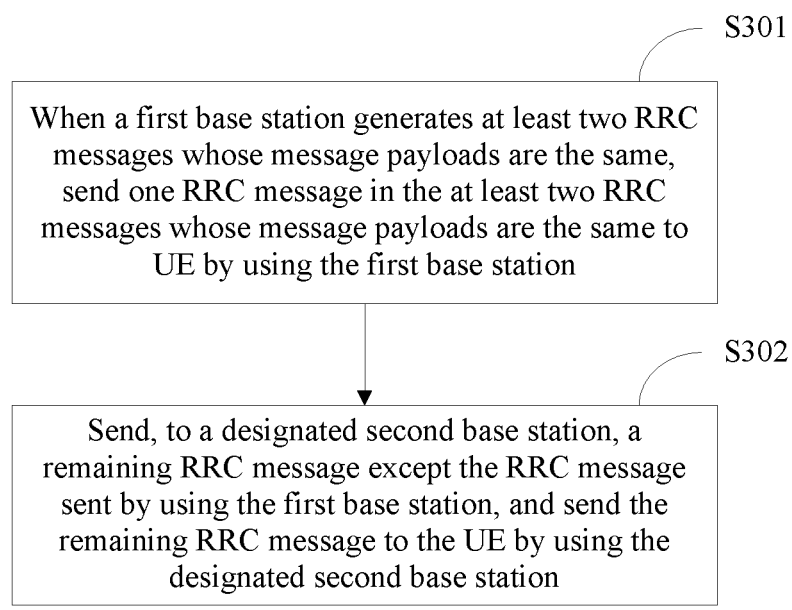
FIG. 3 is a flowchart of an RRC message processing method applied to a first base station side according to an embodiment of the present invention.

Corresponding to the foregoing method shown in FIG. 2, an RRC message processing method provided in an embodiment of the present invention is applied to a first base station side, and as shown in FIG. 3, specifically includes the following steps:

S301. When a first base station generates at least two RRC messages whose message payloads are the same, send one RRC message in the at least two RRC messages whose message payloads are the same to UE by using the first base station.

S302. Send, to a designated second base station, a remaining RRC message except the RRC message sent by using the first base station, and send the remaining RRC message to the UE by using the designated second base station.

Further, this embodiment of the present invention may be applicable to not only a scenario including a macro base station and a small cell node, but also a scenario including one macro base station and another macro base station and a scenario including one small cell node and another small cell node. The present invention sets no limitation thereto. That is, the first base station may be a macro base station, and correspondingly, the second base station may be another macro base station or a small cell node; the first base station may be a small cell node, and correspondingly, the second base station may be another small cell node.

It may be understood that, when the first base station is a macro base station, the macro base station may generate an RRC message, and when the first base station is a small cell node, the small cell node may generate an RRC message.

Further, the designated second base station is pre-designated. The first base station may configure the second base station for the UE according to a service situation of the UE, for example, traffic of the UE, a service quality requirement, a movement speed of the UE, a load situation of the first base station, and a result of measuring a base station around the UE by the UE. When sending an RRC message to a bottom layer of a protocol stack, the first base station may notify, each time an RRC message is sent to the bottom layer of the protocol stack, the bottom layer of the protocol stack of a second base station to which the RRC message needs to be sent (because second base stations to which RRC messages need to be sent may be different). Alternatively, a bottom layer of a protocol stack may also be notified once in advance of a second base station to which an RRC message needs to be sent, and the bottom layer of the protocol stack sends the RRC message to the second station always. In addition, there may be one or more designated second base stations according to an actual need. A main processing step of each second base station is: receiving an RRC message sent by the first base station, and sending the RRC message to UE designated by the first base station.

Further, in the foregoing step S301, before sending an RRC message to the UE and the designated second base station, the first base station may further send a repeated-RRC message processing instruction to the UE. The repeated-RRC message processing instruction is used to indicate to the UE that there is an RRC message repeated with an RRC message received after the repeated-RRC message processing instruction is received, or the repeated-RRC message processing instruction is used to indicate that the UE needs to determine whether at least one RRC message received after the repeated-RRC message processing instruction is received is a repeated RRC message.

To further illustrate the RRC message processing method provided in this embodiment of the present invention, the present invention provides specific embodiments:

Embodiment 1

Figure 4:
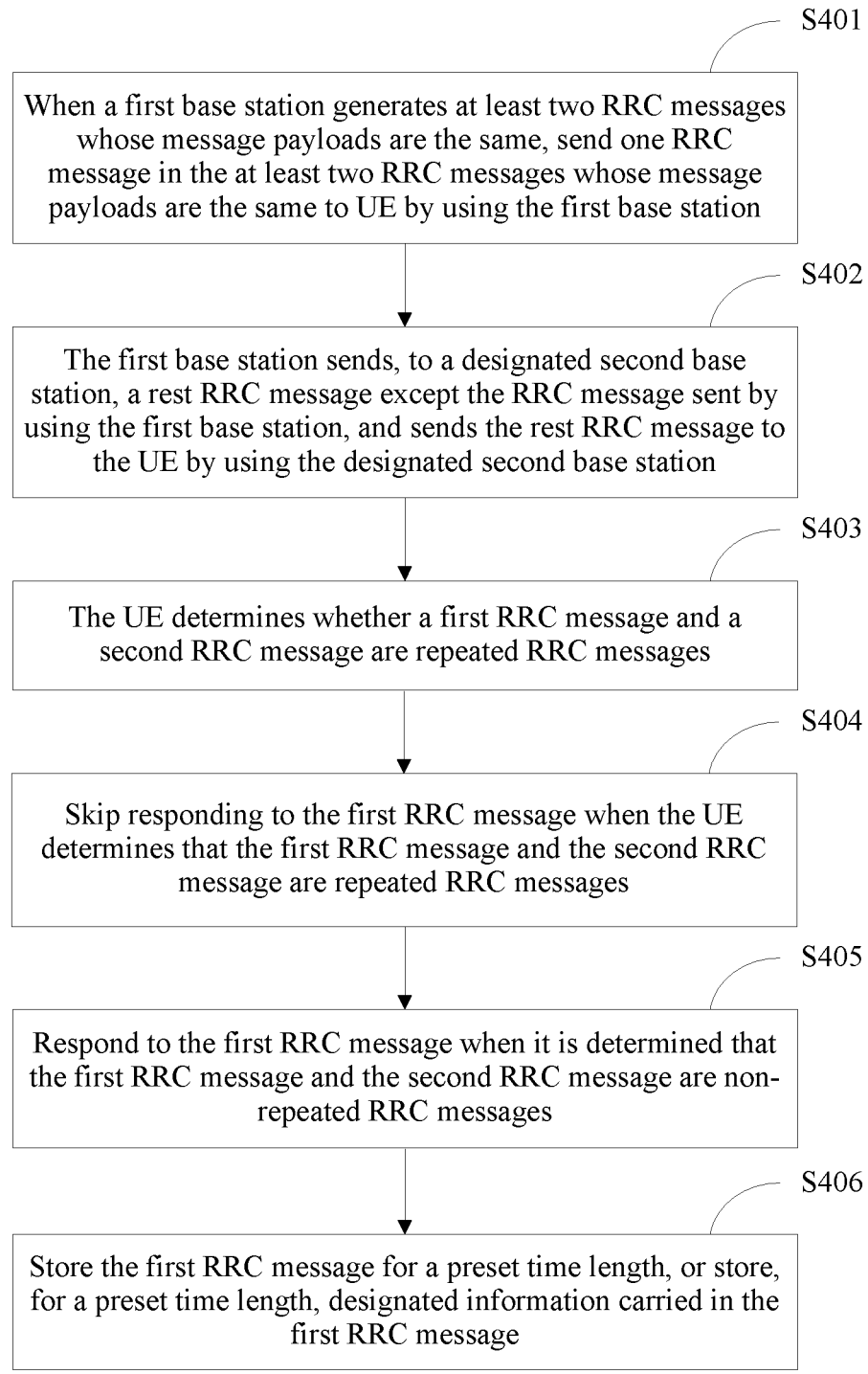
FIG. 4 is a flowchart of an RRC message processing method according to Embodiment 1 of the present invention.

FIG. 4 is a flowchart of an RRC message processing method according to Embodiment 1, and specific steps are as follows:

S401. When a first base station generates at least two RRC messages whose message payloads are the same, send one RRC message in the at least two RRC messages whose message payloads are the same to UE by using the first base station.

S402. The first base station sends, to a designated second base station, a remaining RRC message except the RRC message sent by using the first base station, and sends the remaining RRC message to the UE by using the designated second base station.

S403. The UE determines, according to designated information carried in a received first RRC message and designated information carried in a second RRC message received before the first RRC message is received, whether the first RRC message and the second RRC message are repeated RRC messages.

The designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information.

Further, for a manner of determining whether the first RRC message and the second RRC message are repeated RRC messages in this step, this embodiment provides three exemplary implementation manners.

In a first implementation manner, before this step is executed, a step may further be executed, that is, it is determined whether the designated information of the first RRC message includes a repetition identifier, where the repetition identifier is used to indicate that there is another RRC message already sent by a base station or to be sent by a base station, and the another RRC message is the same as the first RRC message including the repetition identifier; and step S403 may be specifically implemented as follows:

when the designated information of the first RRC message includes the repetition identifier, determine, according to the designated information carried in the received first RRC message and the designated information carried in the second RRC message received before the first RRC message is received, whether the first RRC message and the second RRC message are repeated RRC messages.

Further, when the designated information of the first RRC message does not include the repetition identifier, it is determined that the first RRC message and the second RRC message are non-repeated RRC messages.

Further, to ensure RRC message transmission reliability, a base station may copy at least one RRC message whose message payload is the same as that of an RRC message that needs to be sent to the UE, and sends the copied RRC message to designated another base station. Both the base station and the another base station send RRC messages whose message payloads are the same to the UE. In this way, the RRC message transmission reliability can be improved. Therefore, in the first implementation manner, when the base station copies the RRC message, it can be determined that there is an RRC message repeated with the RRC message, and a repetition identifier may be added to the RRC message and the RRC message copied by the base station.

Further, the repetition identifier in the RRC message may have multiple forms. For example, identification may be performed by using a flag bit in the RRC message. Further, when there is a flag bit, it represents that there is an RRC message repeated with the RRC message, and when there is no flag bit, it represents that there is no RRC message repeated with the RRC message. Alternatively, RRC messages may be enabled to have a flag bit, and values of the flag bit are used to represent whether there is an RRC message repeated with the RRC message. For example, when the flag bit is 0, it represents that there is no RRC message repeated with the RRC message, and when the flag bit is 1, it represents that there is an RRC message repeated with the RRC message.

In a second implementation manner, the foregoing designated information may further include: a node identifier of a node sending an RRC message carrying the foregoing designated information; and step S403 may be specifically implemented as follows:

determine, according to a first node identifier carried in the received first RRC message and a second node identifier carried in the second RRC message received and stored before the first RRC message is received, whether a first node sending the first RRC message and a second node sending the second RRC message are a same node; and further, when the first node sending the first RRC message and the second node sending the second RRC message are the same node, determine that the first RRC message and the second RRC message are non-repeated RRC messages.

Further, when the first node sending the first RRC message and the second node sending the second RRC message are not the same node, it is further determined, according to other designated information, except the node identifier, in the designated information carried in the first RRC message and other designated information, except the node identifier, in the designated information carried in the second RRC message, whether the first RRC message and the second RRC message are repeated RRC messages.

Further, in the second implementation manner, to improve RRC message transmission reliability, a base station copies multiple RRC messages whose message payloads are the same, and sends the RRC messages whose message payloads are the same to the UE by using the base station itself and another base station. Therefore, the RRC messages whose message payloads are the same and that are received by the UE are separately from different base stations (the base station and the another base station). That is, although the message payloads of the RRC messages received by the UE are the same, node identifiers are different. Therefore, when the first RRC message and the second RRC message are from a same node, it can be determined that the first RRC message and the second RRC message are non-repeated RRC messages.

Further, the node identifier may be an eNB ID, a physical cell identifier (PCI, Physical Cell Identifier), an E-UTRAN cell global identifier (ECGI, E-UTRAN Cell Global Identifier), a local cell identifier (LCID, Local Cell ID), or the like. These are only examples herein, and any identifier that can identify a node may be used as the node identifier of the node in this step.

In a third implementation manner, before the first RRC message is received, a step may further be included:

A repeated-RRC message processing instruction sent by the base station is received, where the repeated-RRC message processing instruction is used to indicate to the UE that there is an RRC message repeated with the first RRC message after the repeated-RRC message processing instruction is received; or the repeated-RRC message processing instruction is used to instruct the UE to determine, after the repeated-RRC message processing instruction is received, whether the first RRC message and the second RRC message are repeated RRC messages.

Further, in the third implementation manner, before the base station sends an RRC message to the UE, the base station may send the repeated-RRC message processing instruction to the UE, and indicate to the UE that there is an RRC message repeated with an RRC message received after the instruction is received, and the RRC message needs to be processed by using a repeated-RRC message processing mechanism. That is, before step S401 and step S402, the following step may further be included:

The first base station sends a repeated-RRC message processing instruction to the UE, where the repeated-RRC message processing instruction is used to indicate to the UE that there is an RRC message repeated with the RRC message after the repeated-RRC message processing instruction is received; or the repeated-RRC message processing instruction is used to instruct the UE to determine, after the repeated-RRC message processing instruction is received, whether the RRC message and a received RRC message are repeated RRC messages, where the received RRC message is an RRC message received and stored within a preset time length before the RRC message is received; or the received RRC message is an RRC message that stores designated information carried in the received RRC message and that is received within a preset time length before the RRC message is received.

S404. Skip responding to the first RRC message when the UE determines that the first RRC message and the second RRC message are repeated RRC messages.

In this step, because the second RRC message is RRC message stored within a preset time length before the first RRC message is received, before the second RRC message is stored, it can be determined that the second RRC message is a non-repeated RRC message compared with an RRC message stored before the second RRC message is received, a response is made to the second RRC message, and then the second RRC message is stored, so that comparison can be performed between a subsequently received RRC message and the second RRC message. Therefore, after it is determined that the first RRC message and the second RRC message are repeated RRC messages, because a response is already made to the second RRC message, if a response is further made to the first RRC message, an RRC process is repeated, which increases processing complexity of the UE and causes a waste of an air interface resource. Therefore, no response is made to the first RRC message in this step.

Further, the second RRC message is an RRC message received and stored within the preset time length before the first RRC message is received; or the designated information carried in the second RRC message is designated information carried in an RRC message received and stored within the preset time length before the first RRC message is received.

Optionally, the RRC message processing method provided in this embodiment may further include step S405 and step S406.

S405. Respond to the first RRC message when it is determined that the first RRC message and the second RRC message are non-repeated RRC messages.

S406. Store the first RRC message for a preset time length, or store, for a preset time length, the designated information carried in the first RRC message.

In this step, a timer may be disposed for each stored first RRC message or designated information carried in the first RRC message, and the timer is set to the preset time length.

In this step, it is assumed that the set preset time length is t, and the first RRC message is stored for a time length t starting from a moment t1. When a new RRC message is received at a moment t2, and t2−t1 is not greater than the time length t, comparison is performed between designated information carried in the new RRC message and the designated information carried in the stored first RRC message, so as to determine whether the new RRC message and the first RRC message are repeated RRC messages. When a new RRC message is received at a moment t2, and t2−t1 is greater than the time length t, no comparison needs to be performed between designated information carried in the new RRC message and the designated information carried in the first RRC message, and the stored first RRC message may be discarded.

Embodiment 2

Embodiment 1 includes step S401: when a first base station generates at least two RRC messages whose message payloads are the same, send one RRC message in the at least two RRC messages whose message payloads are the same to UE by using the first base station; and S402: the first base station sends, to a designated second base station, a remaining RRC message except the RRC message sent by using the first base station, and sends the remaining RRC message to the UE by using the designated second base station. For different connection architectures between a protocol stack of the first base station and a protocol stack of the second base station, step S401 and step S402 may be implemented in different manners.

Figure 5A:
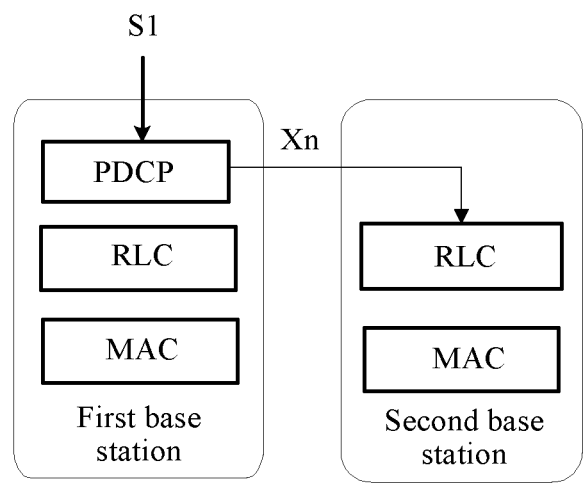
FIG. 5a to FIG. 5c are schematic diagrams of a connection architecture between a first base station and a designated second base station according to an embodiment of the present invention.
Figure 5B:
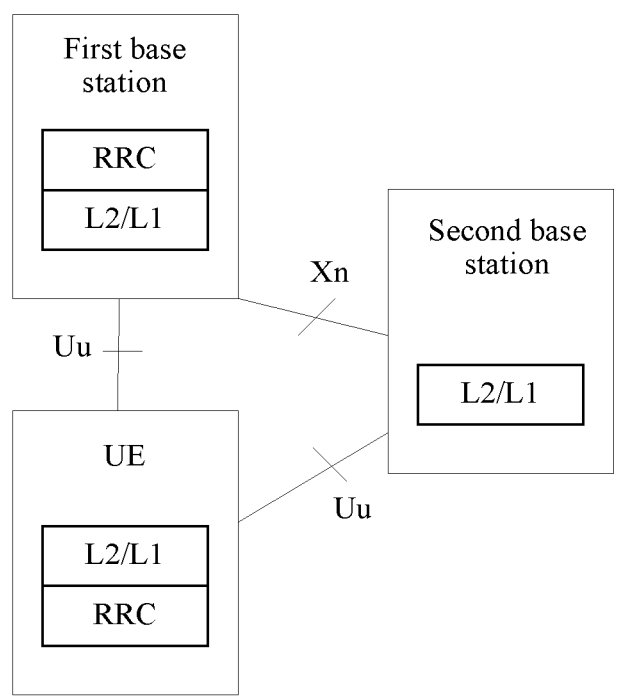
Figure 5C:
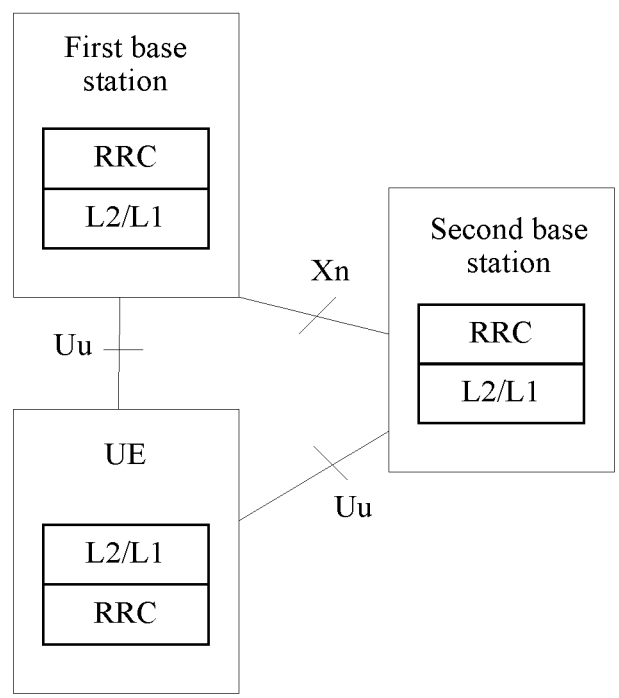

FIG. 5a is a connection architecture between the protocol stack of the first base station and the protocol stack of the second base station, and FIG. 5b and FIG. 5c are control plane architectures of the first base station and the second base station, where the connection architecture of the protocol stacks shown in FIG. 5a may be specifically used in the control plane architectures in FIG. 5b and FIG. 5c, so as to implement communication between the first base station and the second base station. As shown in FIG. 5a, there is a communications interface, for example, an Xn interface, between a PDCP layer of the protocol stack of the first base station itself and a Radio Link Control (RLC, Radio Link Control) layer of the protocol stack of the second base station.

Figure 6:
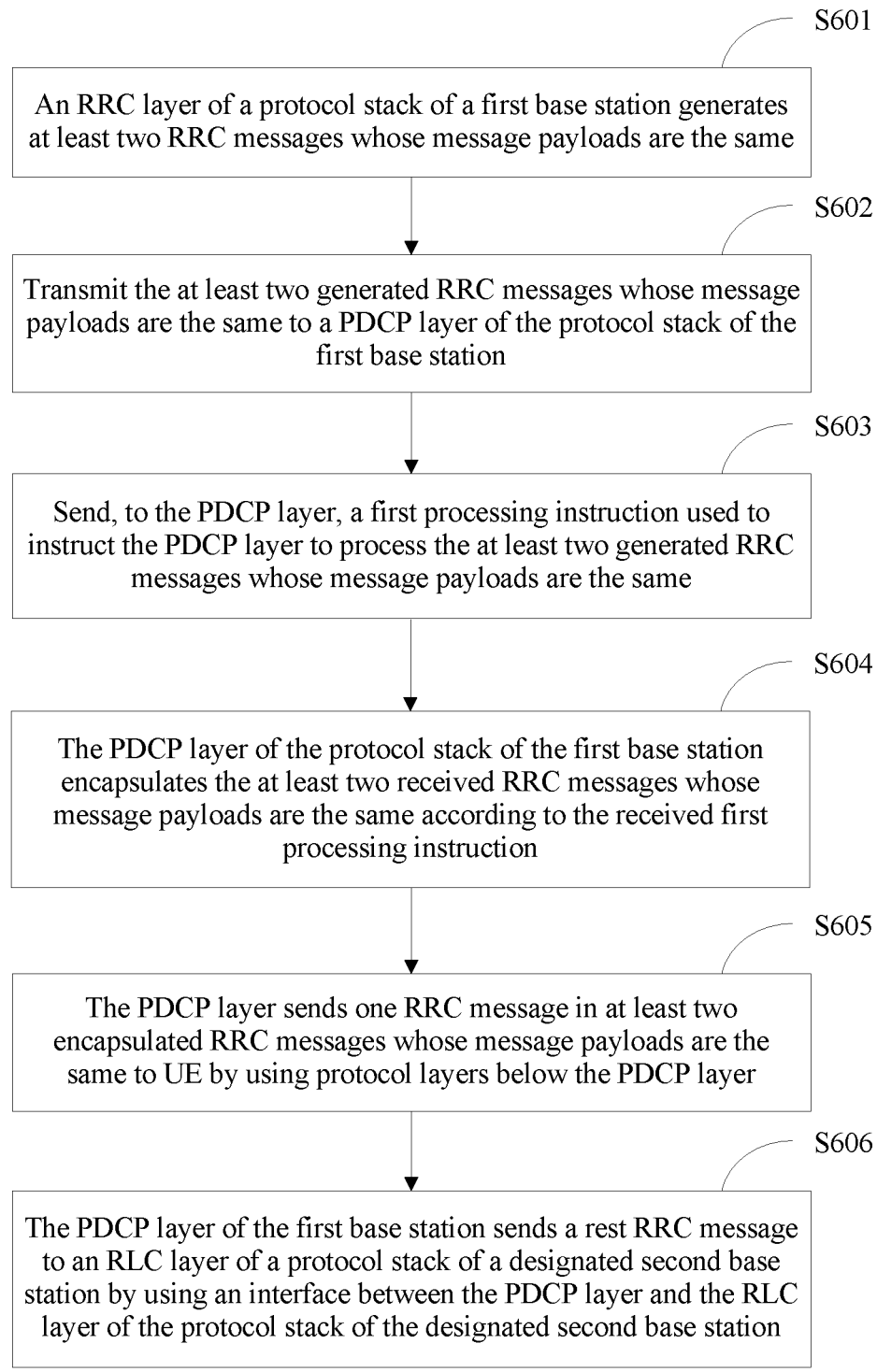
FIG. 6 is a flowchart of a first RRC message processing method according to Embodiment 2 of the present invention.

For the foregoing connection architecture, Embodiment 2 of the present invention provides specific implementation manners of step S401 and step S402. FIG. 6 is a flowchart of an RRC message processing method according to Embodiment 2, where the method is applied to a base station side. Specific steps of the RRC message processing method provided in Embodiment 2 are as follows:

S601. An RRC layer of a protocol stack of a first base station generates at least two RRC messages whose message payloads are the same.

S602. Transmit, to a PDCP layer of the protocol stack of the first base station, the at least two RRC messages whose message payloads are the same and that are generated in S601.

In step S601 and step S602, the RRC layer of the protocol stack of the first base station generates the at least two RRC messages whose message payloads are the same, that is, Packet Data Convergence Protocol service data units (PDCP SDU, Packet Data Convergence Protocol Service Data Unit), and transmits the generated RRC messages to the PDCP layer of the protocol stack of the first base station itself; the PDCP layer further processes the generated RRC messages.

S603. Send, to the PDCP layer, a first processing instruction used to instruct the PDCP layer to process the at least two RRC messages whose message payloads are the same and that are generated in step S601.

S604. The PDCP layer of the protocol stack of the first base station encapsulates, according to the received first processing instruction, the at least two received RRC messages whose message payloads are the same.

S605. The PDCP layer sends one RRC message in at least two encapsulated RRC messages whose message payloads are the same to UE by using protocol layers below the PDCP layer.

S606. The PDCP layer of the first base station sends, according to the received first processing instruction, a remaining RRC message to an RLC layer of a protocol stack of a designated second base station by using an interface between the PDCP layer and the RLC layer of the protocol stack of the designated second base station, where the remaining RRC message is an RRC message that is except the RRC message sent by using the protocol stack of the first base station in S605 and that is in the at least two encapsulated RRC messages whose message payloads are the same in S604.

Specifically, in this step, the PDCP layer encapsulates the RRC messages as Packet Data Convergence Protocol protocol data units (PDCP PDU, Packet Data Convergence Protocol Protocol Data Unit), and sends a remaining PDCP PDU, except a PDCP PDU that is sent to an RLC layer of the protocol stack of the first base station itself, in the PDCP PDUs separately to an RLC layer of a protocol stack of each designated second base station by using an interface between the PDCP layer and the RLC layer of the protocol stack of the designated second base station.

Further, in this embodiment, when configuring an RLC entity or a PDCP entity that is used by a signaling radio bearer (SRB, Signaling Radio Bearer) in which an RRC message is located, the first base station and the designated second base station may configure the RLC entity as Acknowledged Mode Radio Link Control (AM RLC, Acknowledged Mode Radio Link Control) or Unacknowledged Mode Radio Link Control (UM RLC, Unacknowledged Mode Radio Link Control). Preferably, an RLC entity corresponding to the first base station may be configured as AM RLC, and an RLC entity corresponding to the designated second base station is configured as UM RLC.

Figure 7:
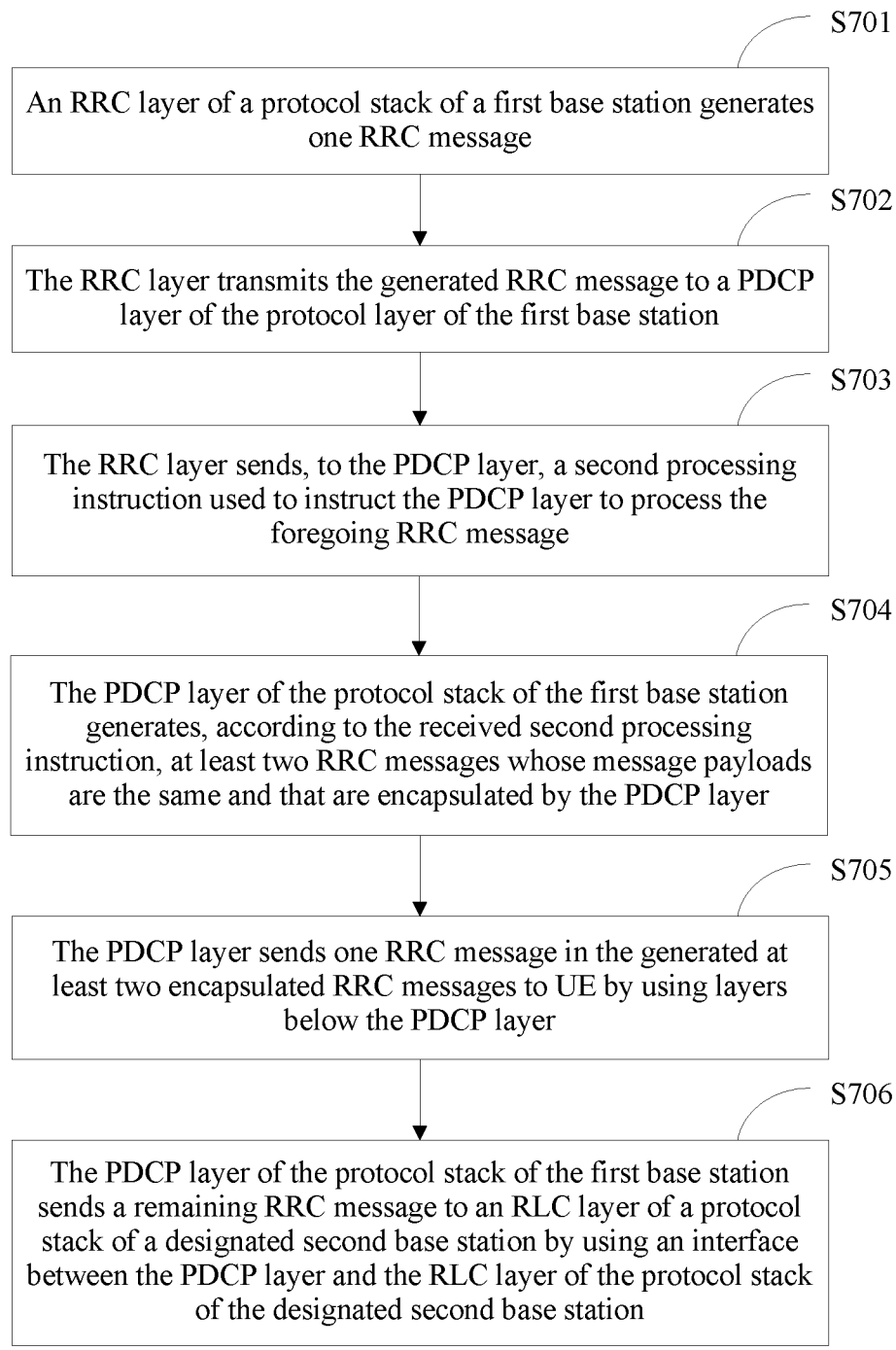
FIG. 7 is a flowchart of a second RRC message processing method according to Embodiment 2 of the present invention.

Further, in the foregoing step S601, the first base station may not generate the at least two RRC messages by using the RRC layer of the protocol stack of the first base station, but transmits one RRC message to the PDCP layer, and the PDCP layer encapsulates the RRC message and generates at least two encapsulated RRC messages. Therefore, based on the foregoing connection architecture provided in this embodiment, Embodiment 2 of the present invention further provides another specific implementation manner of step S401 and step S402. FIG. 7 is a flowchart of another RRC message processing method according to Embodiment 2, where the method is applied to a base station side, and specifically includes the following steps:

S701. An RRC layer of a protocol stack of a first base station generates one RRC message.

S702. The RRC layer transmits the RRC message generated in S701 to a PDCP layer of the protocol stack of the first base station.

S703. The RRC layer sends, to the PDCP layer, a second processing instruction used to instruct the PDCP layer to process the foregoing RRC message.

S704. The PDCP layer of the protocol stack of the first base station generates, according to the received second processing instruction, at least two RRC messages whose message payloads are the same and that are encapsulated by the PDCP layer.

In this step, when the PDCP layer is generating the encapsulated RRC messages, the PDCP layer may first copy multiple RRC messages whose message payloads are the same, that is, PDCP SDUs, according to the received RRC message sent by the RRC layer, and then encapsulates the multiple PDCP SDUs as multiple PDCP PDUs. In this case, the multiple generated PDCP PDUs may be different from each other because PDCP headers respectively added to the multiple PDCP SDUs are different from each other. For example, serial numbers (SN, Serial Number) in the PDCP headers may be different. Alternatively, the PDCP layer may first encapsulate, as a PDCP PDU, the received RRC message sent by the RRC layer, that is, encapsulate a PDCP SDU as a PDCP PDU; and then copy multiple PDCP PDUs according to the PDCP PDU. In this case, the multiple generated PDCP PDUs may be the same, and SN numbers in PDCP headers may be the same.

S705. The PDCP layer sends one RRC message in the generated at least two encapsulated RRC messages to UE by using layers below the PDCP layer.

S706. The PDCP layer of the protocol stack of the first base station sends, according to the received second processing instruction, a remaining RRC message to an RLC layer of a protocol stack of a designated second base station by using an interface between the PDCP layer and the RLC layer of the protocol stack of the designated second base station, where the remaining RRC message is an RRC message that is except the encapsulated RRC message sent by using the protocol stack of the first base station in S705 and that is in the at least two encapsulated RRC messages generated in S704.

Embodiment 3

Figure 8A:
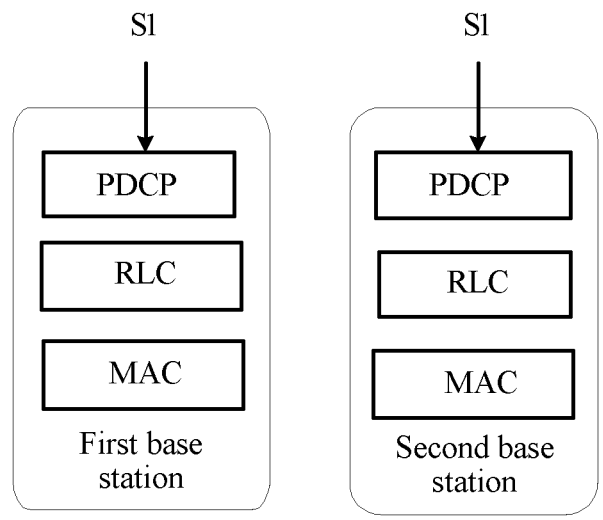
FIG. 8a and FIG. 8b are schematic diagrams of a connection architecture between a first base station and a designated second base station according to an embodiment of the present invention.
Figure 8B:
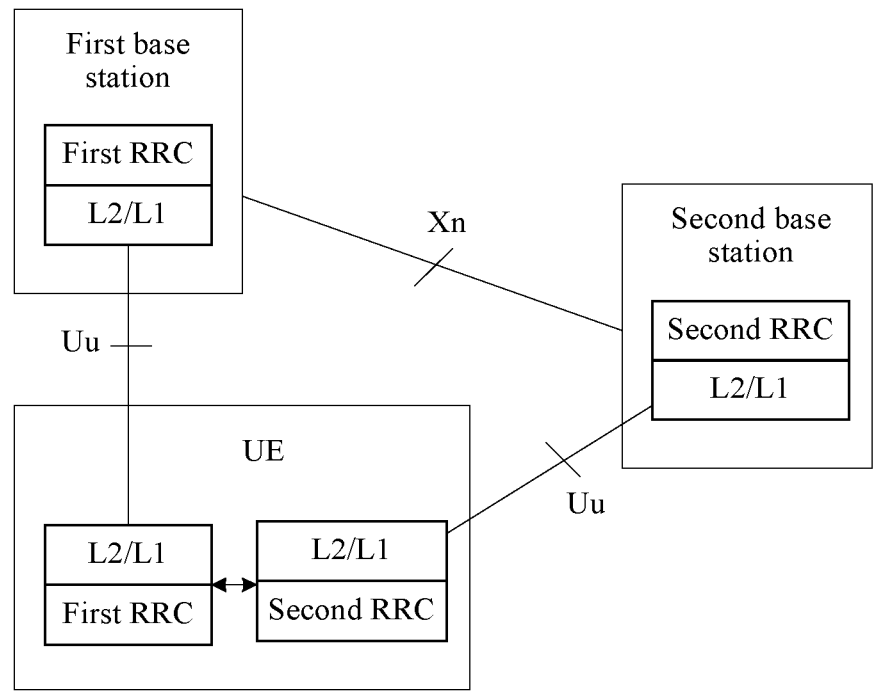

Different from Embodiment 2, Embodiment 3 provides another connection architecture between a protocol stack of a first base station and a protocol stack of a second base station, which is shown in FIG. 8a and FIG. 8b. FIG. 8a is the connection architecture between the protocol stack of the first base station and the protocol stack of the second base station, and FIG. 8*b* is control plane architectures of the first base station and the second base station, where the connection architecture of the protocol stacks shown in FIG. 8*a* may be specifically used in the control plane architectures in FIG. 8*b*, so as to implement communication between the first base station and the second base station. As shown in FIG. 8*a*, there is a communications interface, for example, an Xn interface, between an RRC layer of the protocol stack of the first base station itself and a PDCP layer of the protocol stack of the second base station.

Figure 9:
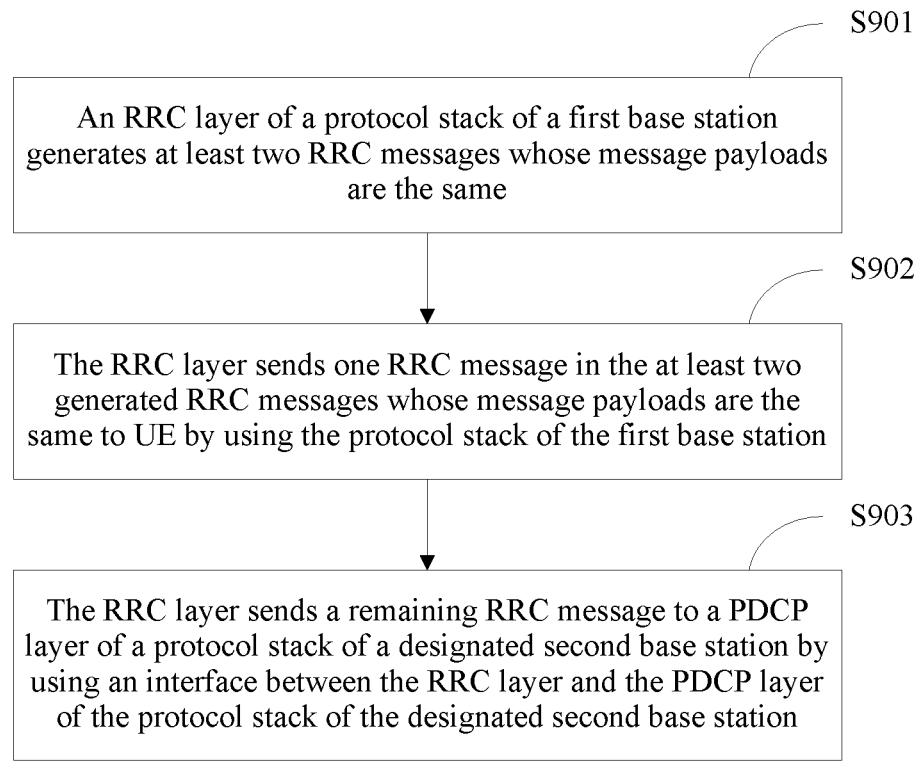
FIG. 9 is a flowchart of an RRC message processing method according to Embodiment 3 of the present invention.

For the foregoing connection architecture, Embodiment 3 of the present invention provides a specific implementation manner of step S401 and step S402 in Embodiment 1. FIG. 9 is a flowchart of an RRC message processing method according to Embodiment 3, where the method is applied to a base station side, and specific steps are as follows:

S901. An RRC layer of a protocol stack of a first base station generates at least two RRC messages whose message payloads are the same.

S902. The RRC layer sends, to UE by using the protocol stack of the first base station, one RRC message in the at least two RRC messages whose message payloads are the same and that are generated in S901.

S903. The RRC layer sends a remaining RRC message to a PDCP layer of a protocol stack of a designated second base station by using an interface between the RRC layer and the PDCP layer of the protocol stack of the designated second base station, where the remaining RRC message is an RRC message that is except the RRC message sent by using the protocol stack of the first base station in S902 and that is in the at least two RRC messages whose message payloads are the same and that are generated in step S901.

Further, in this step, the RRC layer of the first base station sends the RRC message separately to a PDCP layer of the protocol stack of the first base station and a PDCP layer of a protocol stack of each designated second base station, and the protocol stack of the first base station and each PDCP layer of the protocol stack of each designated second base station perform an operation such as coding and compression on the RRC layer according to their settings. Therefore, an RRC message encapsulated by each PDCP layer may be different. Correspondingly, when receiving RRC messages from different nodes, the UE executes, by using a corresponding mechanism, an operation such as decoding and decompression corresponding to an operation such as coding and compression of PDCP layers in the different nodes, and parses messages of different PDCP layers encapsulating the RRC messages, so as to obtain RRC messages for comparison. As shown in FIG. 8*b*, when there is one designated second base station, there may be two protocol stacks on the UE side that respectively receive messages from the first base station and the designated second base station and respectively parse the received messages.

Based on a same inventive concept, embodiments of the present invention further provide user equipment UE and a base station. Because principles of problems resolved by the UE and the base station are similar to the foregoing RRC message processing method, for implementation of the UE and the base station, reference may be made to implementation of the foregoing method. Repeated details are not described again.

Figure 10:
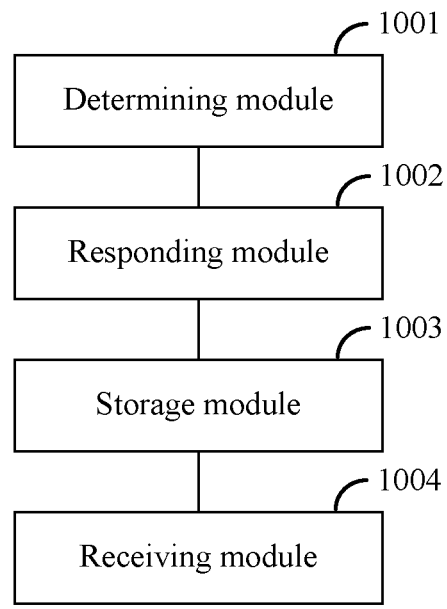
FIG. 10 is a schematic structural diagram of UE according to an embodiment of the present invention.

An embodiment of the present invention provides user equipment UE, as shown in FIG. 10, including the following modules:

a determining module 1001, configured to determine, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and a responding module 1002, configured to skip responding to the first RRC message when the determining module 1001 determines that the first RRC message and the second RRC message are repeated RRC messages.

Further, the UE further includes a storage module 1003, where the responding module 1002 is further configured to respond to the first RRC message when the determining module 1001 determines that the first RRC message and the second RRC message are non-repeated RRC messages; and the storage module 1003 is configured to: when the determining module 1001 determines that the first RRC message and the second RRC message are non-repeated RRC messages, store the first RRC message for a preset time length, or store, for a preset time length, the designated information carried in the first RRC message.

Further, the second RRC message is an RRC message received and stored within the preset time length before the first RRC message is received; or the designated information carried in the second RRC message is designated information carried in an RRC message received and stored within the preset time length before the first RRC message is received.

Further, the determining module 1001 is further configured to: before it is determined whether the first RRC message and the second RRC message are repeated RRC messages, determine whether the designated information of the first RRC message includes a repetition identifier, where the repetition identifier is used to indicate that there is another RRC message already sent by a base station or to be sent by a base station, and the another RRC message is the same as the first RRC message including the repetition identifier; and the determining module 1001 is specifically configured to: when the designated information of the first RRC message includes the repetition identifier, determine, according to the designated information carried in the received first RRC message and the designated information carried in the second RRC message received before the first RRC message is received, whether the first RRC message and the second RRC message are repeated RRC messages.

Further, the determining module 1001 is specifically configured to: when the designated information of the first RRC message does not include the repetition identifier, determine that the first RRC message and the second RRC message are non-repeated RRC messages.

Further, the designated information further includes: a node identifier of a node sending an RRC message carrying the designated information; and the determining module 1001 is specifically configured to: determine, according to a first node identifier carried in the received first RRC message and a second node identifier carried in the second RRC message received and stored before the first RRC message is received, whether a first node sending the first RRC message and a second node sending the second RRC message are a same node; and when the first node sending the first RRC message and the second node sending the second RRC message are the same node, determine that the first RRC message and the second RRC message are non-repeated RRC messages.

Further, the UE further includes a receiving module 1004, where the receiving module 1004 is configured to: before the first RRC message is received, receive a repeated-RRC message processing instruction sent by the base station, where the repeated-RRC message processing instruction is used to indicate to the UE that there is an RRC message repeated with the first RRC message after the repeated-RRC message processing instruction is received; or the repeated-RRC message processing instruction is used to instruct the UE to determine, after the repeated-RRC message processing instruction is received, whether the first RRC message and the second RRC message are repeated RRC messages.

Figure 11:
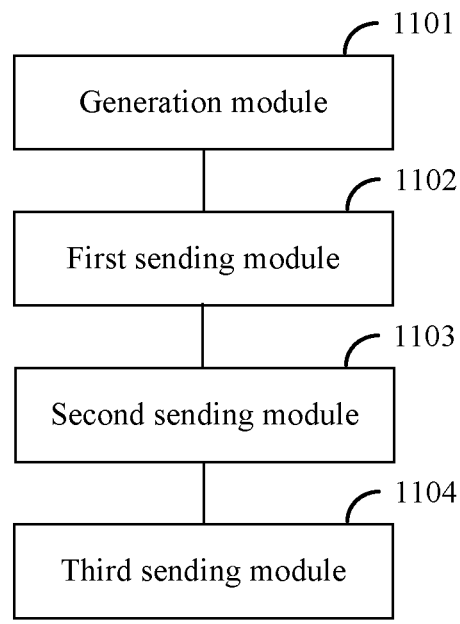
FIG. 11 is a schematic structural diagram of a base station according to an embodiment of the present invention.

An embodiment of the present invention provides a base station, as shown in FIG. 11, including the following modules:

a generation module 1101, configured to generate an RRC message;

a first sending module 1102, configured to: when the generation module 1101 generates at least two RRC messages whose message payloads are the same, send one RRC message in the at least two RRC messages whose message payloads are the same to UE by using the base station; and a second sending module 1103, configured to: send, to designated another base station, a remaining RRC message except the RRC message sent by using the base station, and send the remaining RRC message to the UE by using the designated another base station.

Further, there is a communications interface between a Packet Data Convergence Protocol PDCP layer of a protocol stack of the base station and a Radio Link Control RLC layer of a protocol stack of the designated another base station;

the generation module 1101 is specifically configured to be used by an RRC layer of the protocol stack of the base station to: generate at least two RRC messages whose message payloads are the same; transmit the at least two RRC messages whose message payloads are the same to the PDCP layer of the protocol stack of the base station; and send, to the PDCP layer, a first processing instruction used to instruct the PDCP layer to process the at least two RRC messages whose message payloads are the same;

the first sending module 1102 is specifically configured to be used by the PDCP layer of the protocol stack of the base station to: encapsulate the at least two RRC messages whose message payloads are the same according to the received first processing instruction sent by the generation module 1101; and send one RRC message in at least two encapsulated RRC messages whose message payloads are the same to the UE by using protocol layers below the PDCP layer; and the second sending module 1103 is specifically configured to be used by the PDCP layer of the protocol stack of the base station to: send, according to the received first processing instruction sent by the generation module 1101, a remaining RRC message to the RLC layer of the protocol stack of the designated another base station by using the interface between the PDCP layer and the RLC layer of the protocol stack of the designated another base station, where the remaining RRC message is an RRC message that is except the RRC message sent by using the protocol stack of the base station and that is in the at least two encapsulated RRC messages whose message payloads are the same.

Further, there is a communications interface between a PDCP layer of a protocol stack of the base station and an RLC layer of a protocol stack of the designated another base station;

the generation module 1101 is specifically configured to be used by an RRC layer of the protocol stack of the base station to: generate one RRC message, transmit the RRC message to the PDCP layer of the protocol stack of the base station, and send, to the PDCP layer, a second processing instruction used to instruct the PDCP layer to process the RRC message; and configured to be used by the PDCP layer of the first base station to generate, according to the received second processing instruction, at least two RRC messages whose message payloads are the same and that are encapsulated by the PDCP layer;

the first sending module 1102 is specifically configured to be used by the PDCP layer of the protocol stack of the base station to send, to the UE by using layers below the PDCP layer, one RRC message in at least two encapsulated RRC messages generated by the generation module 1101; and the second sending module 1103 is specifically configured to be used by the PDCP layer of the protocol stack of the base station to: send, according to the received second processing instruction, a remaining RRC message to the RLC layer of the protocol stack of the designated another base station by using the interface between the PDCP layer and the RLC layer of the protocol stack of the designated another base station, where the remaining RRC message is an RRC message that is except the RRC message sent by using the protocol stack of the base station and that is in the at least two encapsulated RRC messages.

Further, there is a communications interface between an RRC layer of a protocol stack of the base station itself and a PDCP layer of a protocol stack of the designated another base station;

the generation module 1101 is specifically configured to be used by the RRC layer of the protocol stack of the base station to generate at least two RRC messages whose message payloads are the same;

the first sending module 1102 is specifically configured to be used by the RRC layer of the protocol stack of the base station to send, to the UE by using the protocol stack of the base station, one RRC message in the at least two RRC messages whose message payloads are the same and that are generated by the generation module 1101; and the second sending module 1103 is specifically configured to be used by the RRC layer of the protocol stack of the base station to send a remaining RRC message to the PDCP layer of the protocol stack of the designated another base station by using the interface between the RRC layer and the PDCP layer of the protocol stack of the designated another base station, where the remaining RRC message is an RRC message that is except the RRC message sent by using the protocol stack of the base station and that is in the at least two RRC messages whose message payloads are the same.

Further, the base station further includes a third sending module 1104, where the third sending module 1104 is configured to: before the first sending module 1102 sends an RRC message to the UE and the second sending module 1103 sends an RRC message to the designated another base station, send a repeated-RRC message processing instruction to the UE, where the repeated-RRC message processing instruction is used to indicate to the UE that there is an RRC message repeated with an RRC message received after the repeated-RRC message processing instruction is received; or the repeated-RRC message processing instruction is used to instruct the UE to determine, after the repeated-RRC message processing instruction is received, whether the RRC message and a received RRC message are repeated RRC messages, where the received RRC message is an RRC message received and stored within a preset time length before the RRC message is received; or the received RRC message is an RRC message that stores designated information carried in the received RRC message and that is received within a preset time length before the RRC message is received.

Based on a same inventive concept, embodiments of the present invention further provide user equipment UE and a base station. Because principles of problems resolved by the UE and the base station are similar to the foregoing RRC message processing method, for implementation of the UE and the base station, reference may be made to implementation of the foregoing method. Repeated details are not described again.

Figure 12:
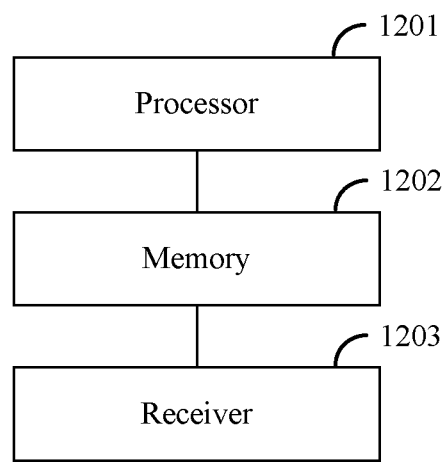
FIG. 12 is a schematic structural diagram of UE according to an embodiment of the present invention.

An embodiment of the present invention provides user equipment UE, as shown in FIG. 12, including:

a processor 1201, configured to: determine, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and skip responding to the first RRC message when it is determined that the first RRC message and the second RRC message are repeated RRC messages.

Further, the UE further includes a memory 1202, where the processor 1201 is further configured to respond to the first RRC message when it is determined that the first RRC message and the second RRC message are non-repeated RRC messages; and the memory 1202 is configured to: when the processor 1201 determines that the first RRC message and the second RRC message are non-repeated RRC messages, store the first RRC message for a preset time length, or store, for a preset time length, the designated information carried in the first RRC message.

Further, the second RRC message is an RRC message received and stored within the preset time length before the first RRC message is received; or the designated information carried in the second RRC message is designated information carried in an RRC message received and stored within the preset time length before the first RRC message is received.

Further, the processor 1201 is further configured to: before it is determined whether the first RRC message and the second RRC message are repeated RRC messages, determine whether the designated information of the first RRC message includes a repetition identifier, where the repetition identifier is used to indicate that there is another RRC message already sent by a base station or to be sent by a base station, and the another RRC message is the same as the first RRC message including the repetition identifier; and the processor 1201 is specifically configured to: when designated information of the first RRC message includes the repetition identifier, determine, according to the designated information carried in the received first RRC message and the designated information carried in the second RRC message received before the first RRC message is received, whether the first RRC message and the second RRC message are repeated RRC messages.

Further, the processor 1201 is specifically configured to: when the designated information of the first RRC message does not include the repetition identifier, determine that the first RRC message and the second RRC message are non-repeated RRC messages.

Further, the designated information further includes: a node identifier of a node sending an RRC message carrying the designated information; and the processor 1201 is specifically configured to: determine, according to a first node identifier carried in the received first RRC message and a second node identifier carried in the second RRC message received and stored before the first RRC message is received, whether a first node sending the first RRC message and a second node sending the second RRC message are a same node; and when the first node sending the first RRC message and the second node sending the second RRC message are the same node, determine that the first RRC message and the second RRC message are non-repeated RRC messages.

Further, the UE further includes a receiver 1203, where the receiver 1203 is configured to: before the first RRC message is received, receive a repeated-RRC message processing instruction sent by the base station, where the repeated-RRC message processing instruction is used to indicate to the UE that there is an RRC message repeated with the first RRC message after the repeated-RRC message processing instruction is received; or the repeated-RRC message processing instruction is used to instruct the UE to determine, after the repeated-RRC message processing instruction is received, whether the first RRC message and the second RRC message are repeated RRC messages.

Figure 13:
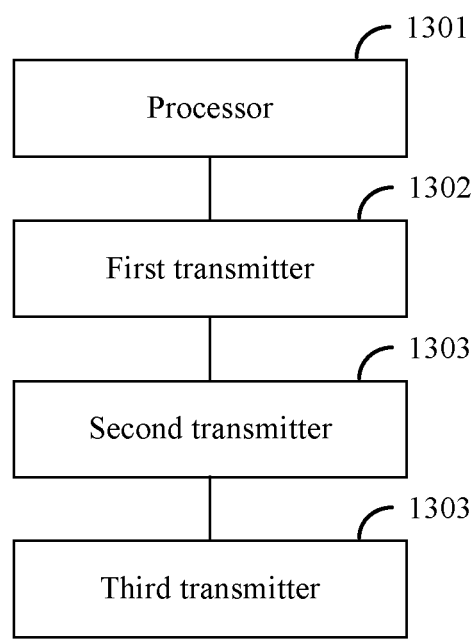
FIG. 13 is a schematic structural diagram of a base station according to an embodiment of the present invention.

An embodiment of the present invention provides a base station, as shown in FIG. 13, including:

a processor 1301, configured to generate an RRC message;

a first transmitter 1302, configured to: when the processor 1301 generates at least two RRC messages whose message payloads are the same, send one RRC message in the at least two RRC messages whose message payloads are the same to UE by using the base station; and a second transmitter 1303, configured to: send, to designated another base station, a remaining RRC message except the RRC message sent by using the base station, and send the remaining RRC message to the UE by using the designated another base station.

Further, there is a communications interface between a Packet Data Convergence Protocol PDCP layer of a protocol stack of the base station and a Radio Link Control RLC layer of a protocol stack of the designated another base station;

the processor 1301 is specifically configured to be used by an RRC layer of the protocol stack of the base station to: generate at least two RRC messages whose message payloads are the same; transmit the at least two RRC messages whose message payloads are the same to the PDCP layer of the protocol stack of the base station; and send, to the PDCP layer, a first processing instruction used to instruct the PDCP layer to process the at least two RRC messages whose message payloads are the same;

the first transmitter 1302 is specifically configured to be used by the PDCP layer of the protocol stack of the base station to: encapsulate the at least two RRC messages whose message payloads are the same according to the received first processing instruction sent by the processor 1301; and send one RRC message in at least two encapsulated RRC messages whose message payloads are the same to the UE by using protocol layers below the PDCP layer; and the second transmitter 1303 is specifically configured to be used by the PDCP layer of the protocol stack of the base station to send, according to the received first processing instruction sent by the processor 1301, a remaining RRC message to the RLC layer of the protocol stack of the designated another base station by using the interface between the PDCP layer and the RLC layer of the protocol stack of the designated another base station, where the remaining RRC message is an RRC message that is except the RRC message sent by using the protocol stack of the base station and that is in the at least two encapsulated RRC messages whose message payloads are the same.

Further, there is a communications interface between a PDCP layer of a protocol stack of the base station and an RLC layer of a protocol stack of the designated another base station;

the processor 1301 is specifically configured to be used by an RRC layer of the protocol stack of the base station to: generate one RRC message, transmit the RRC message to the PDCP layer of the protocol stack of the base station, and send, to the PDCP layer, a second processing instruction used to instruct the PDCP layer to process the RRC message; and configured to be used by the PDCP layer of the first base station to generate, according to the received second processing instruction, at least two RRC messages whose message payloads are the same and that are encapsulated by the PDCP layer;

the first transmitter 1302 is specifically configured to be used by the PDCP layer of the protocol stack of the base station to send, to the UE by using layers below the PDCP layer, one RRC message in at least two encapsulated RRC messages generated by the processor 1301; and the second transmitter 1303 is specifically configured to be used by the PDCP layer of the protocol stack of the base station to send, according to the received second processing instruction, a remaining RRC message to the RLC layer of the protocol stack of the designated another base station by using the interface between the PDCP layer and the RLC layer of the protocol stack of the designated another base station, where the remaining RRC message is an RRC message that is except the RRC message sent by using the protocol stack of the base station and that is in the at least two encapsulated RRC messages.

Further, there is a communications interface between an RRC layer of a protocol stack of the base station itself and a PDCP layer of a protocol stack of the designated another base station;

the processor 1301 is specifically configured to be used by the RRC layer of the protocol stack of the base station to generate at least two RRC messages whose message payloads are the same;

the first transmitter 1302 is specifically configured to be used by the RRC layer of the protocol stack of the base station to: send, to the UE by using the protocol stack of the base station, one RRC message in the at least two RRC messages whose message payloads are the same and that are generated by the processor 1301; and the second transmitter 1303 is specifically configured to be used by the RRC layer of the protocol stack of the base station to send a remaining RRC message to the PDCP layer of the protocol stack of the designated another base station by using the interface between the RRC layer and the PDCP layer of the protocol stack of the designated another base station, where the remaining RRC message is an RRC message that is except the RRC message sent by using the protocol stack of the base station and that is in the at least two RRC messages whose message payloads are the same.

Further, the base station further includes a third transmitter 1304, where the third transmitter 1304 is configured to: before the first transmitter 1302 sends an RRC message to the UE and the second transmitter 1303 sends an RRC message to the designated another base station, send a repeated-RRC message processing instruction to the UE, where the repeated-RRC message processing instruction is used to indicate to the UE that there is an RRC message repeated with an RRC message received after the repeated-RRC message processing instruction is received; or the repeated-RRC message processing instruction is used to instruct the UE to determine, after the repeated-RRC message processing instruction is received, whether the RRC message and a received RRC message are repeated RRC messages, where the received RRC message is an RRC message received and stored within a preset time length before the RRC message is received; or the received RRC message is an RRC message that stores designated information carried in the received RRC message and that is received within a preset time length before the RRC message is received.

The embodiments of the present invention provide the RRC message processing method, the user equipment, and the base station. On a base station side, when a first base station generates at least two RRC messages whose message payloads are the same, one RRC message in the at least two RRC messages whose message payloads are the same is sent to UE by using the first base station, a remaining RRC message except the RRC message sent by using the first base station is sent separately to a designated second base station, and the remaining RRC message is sent to the UE by using the designated second base station. The at least two RRC messages whose message payloads are the same are sent to the UE by means of cooperation between the first base station and the designated second base station, which improves RRC message transmission reliability.

On a UE side, it is determined, according to designated information carried in a received first RRC message and designated information carried in a second RRC message received before the first RRC message is received, whether the first RRC message and the second RRC message are repeated RRC messages, where the designated information includes at least one of the following information: an RRC transaction identifier corresponding to an RRC message carrying the designated information, an RRC message type corresponding to an RRC message carrying the designated information, or a message payload of an RRC message corresponding to an RRC message carrying the designated information; and no response is made to the first RRC message when it is determined that the first RRC message and the second RRC message are repeated RRC messages. When multiple RRC messages are received on the UE side, not all the RRC messages are processed. Instead, it is first determined whether the multiple RRC messages are repeated RRC messages, and no response is made to a repeated RRC message. Therefore, processing complexity of the UE is reduced while RRC message transmission reliability is improved, thereby avoiding a waste of an air interface resource.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. An RRC message processing method, comprising:
  determining whether designated information of a received first RRC message comprises a repetition identifier, wherein the repetition identifier is used to indicate that there is another RRC message already sent by a base station or to be sent by a base station, and the another RRC message is the same as the first RRC message comprising the repetition identifier;
  determining, according to the designated information carried in the received first RRC message and designated information carried in a second RRC message received before the first RRC message is received, whether the first RRC message and the second RRC message are repeated RRC messages, wherein the designated information comprises at least one of the following information:
    an RRC transaction identifier corresponding to an RRC message carrying the designated information,
    an RRC message type corresponding to an RRC message carrying the designated information, or
    a message payload of an RRC message corresponding to an RRC message carrying the designated information, and the determining, according to the designated information carried in the received first RRC message and designated information carried in a second RRC message received before the first RRC message is received, whether the first RRC message and the second RRC message are repeated RRC messages, comprising:
    when the designated information of the first RRC message comprises the repetition identifier, determining, according to the designated information carried in the received first RRC message and the designated information carried in the second RRC message received before the first RRC message is received, whether the first RRC message and the second RRC message are repeated RRC messages; and
  skipping responding to the first RRC message when it is determined that the first RRC message and the second RRC message are repeated RRC messages.

2. The method according to claim 1, further comprising:
  responding to the first RRC message when it is determined that the first RRC message and the second RRC message are non-repeated RRC messages; and
  storing the first RRC message for a preset time length, or storing, for a preset time length, the designated information carried in the first RRC message.

3. The method according to claim 2, wherein
  the second RRC message is an RRC message received and stored within the preset time length before the first RRC message is received; or
  the designated information carried in the second RRC message is designated information carried in an RRC message received and stored within the preset time length before the first RRC message is received.

4. The method according to claim 1, wherein the determining, according to designated information carried in a received first RRC message and designated information carried in a second RRC message received before the first RRC message is received, whether the first RRC message and the second RRC message are repeated RRC messages comprises:
  when the designated information of the first RRC message does not comprise the repetition identifier, determining that the first RRC message and the second RRC message are non-repeated RRC messages.

5. The method according to claim 4, wherein the designated information further comprises: a node identifier of a node sending an RRC message carrying the designated information; and
  the determining, according to designated information carried in a received first RRC message and designated information carried in a second RRC message received before the first RRC message is received, whether the first RRC message and the second RRC message are repeated RRC messages comprises:

determining, according to a first node identifier carried in the received first RRC message and a second node identifier carried in the second RRC message received and stored before the first RRC message is received, whether a first node sending the first RRC message and a second node sending the second RRC message are a same node; and when the first node sending the first RRC message and the second node sending the second RRC message are the same node, determining that the first RRC message and the second RRC message are non-repeated RRC messages.

6. User equipment UE, comprising:
a memory to store instructions; and
a processor to execute the instructions to configure the UE to:
    determine whether designated information of a received first RRC message comprises a repetition identifier, wherein the repetition identifier is used to indicate that there is another RRC message already sent by a base station or to be sent by a base station, and the another RRC message is the same as the first RRC message comprising the repetition identifier;
    determine, according to the designated information carried in the received first RRC message and designated information carried in a second RRC message received before the first RRC message is received, whether the first RRC message and the second RRC message are repeated RRC messages, wherein the designated information comprises at least one of the following information:
        an RRC transaction identifier corresponding to an RRC message carrying the designated information,
        an RRC message type corresponding to an RRC message carrying the designated information, or
        a message payload of an RRC message corresponding to an RRC message carrying the designated information, and the determine, according to the designated information carried in the received first RRC message and designated information carried in a second RRC message received before the first RRC message is received, whether the first RRC message and the second RRC message are repeated RRC messages, comprising:
        when the designated information of the first RRC message comprises the repetition identifier, determine, according to the designated information carried in the received first RRC message and the designated information carried in the second RRC message received before the first RRC message is received, whether the first RRC message and the second RRC message are repeated RRC messages; and
    skip responding to the first RRC message when the UE determines that the first RRC message and the second RRC message are repeated RRC messages.

7. The UE according to claim 6, wherein the processor to further execute the instructions to configure the UE to
    respond to the first RRC message when the UE determines that the first RRC message and the second RRC message are non-repeated RRC messages; and
    UE determines that the first RRC message and the second RRC message are non-repeated RRC messages, store the first RRC message for a preset time length, or store, for a preset time length, the designated information carried in the first RRC message.

8. The UE according to claim 7, wherein the second RRC message is an RRC message received and stored within the preset time length before the first RRC message is received; or the designated information carried in the second RRC message is designated information carried in an RRC message received and stored within the preset time length before the first RRC message is received.

9. The UE according to claim 6, wherein the processor further executes the instructions to configure the UE to: when the designated information of the first RRC message does not comprise the repetition identifier, determine that the first RRC message and the second RRC message are non-repeated RRC messages.

10. The UE according to claim 9, wherein the designated information further comprises: a node identifier of a node sending an RRC message carrying the designated information; and
    the processor further executes the instructions to configure the UE to: determine, according to a first node identifier carried in the received first RRC message and a second node identifier carried in the second RRC message received and stored before the first RRC message is received, whether a first node sending the first RRC message and a second node sending the second RRC message are a same node; and when the first node sending the first RRC message and the second node sending the second RRC message are the same node, determine that the first RRC message and the second RRC message are non-repeated RRC messages.

* * * * *

UNITED STATES PATENT AND TRADEMARK OFFICE
CERTIFICATE OF CORRECTION

PATENT NO. : 10,334,564 B2
APPLICATION NO. : 15/192039
DATED : June 25, 2019
INVENTOR(S) : Wei Quan et al.

Page 1 of 1

It is certified that error appears in the above-identified patent and that said Letters Patent is hereby corrected as shown below:

In the Claims

Column 30, Line 15 (approx.), In Claim 7, after "messages; and" insert -- when the --.

Signed and Sealed this
Twelfth Day of November, 2019

Andrei Iancu
*Director of the United States Patent and Trademark Office*